(12) United States Patent
Chamaret et al.

(10) Patent No.: US 9,761,152 B2
(45) Date of Patent: Sep. 12, 2017

(54) METHOD FOR HARMONIZING COLORS, CORRESPONDING COMPUTER PROGRAM AND DEVICE

(71) Applicant: THOMSON LICENSING, Issy de Moulineaux (FR)

(72) Inventors: Christel Chamaret, Chantepie (FR); Philippe Bordes, Laille (FR); Fabrice Urban, Thorigne Fouillard (FR)

(73) Assignee: THOMSON LICENSING, Issy les Moulineaux (FR)

( * ) Notice: Subject to any disclaimer, the term of this patent is extended or adjusted under 35 U.S.C. 154(b) by 0 days.

(21) Appl. No.: 14/715,520

(22) Filed: May 18, 2015

(65) Prior Publication Data

US 2015/0332605 A1 Nov. 19, 2015

(30) Foreign Application Priority Data

May 19, 2014 (EP) .................................. 14305728

(51) Int. Cl.
*G06T 5/00* (2006.01)
*G06T 7/40* (2017.01)
(Continued)

(52) U.S. Cl.
CPC ....... *G09B 19/0023* (2013.01); *G06K 9/4671* (2013.01); *G06T 7/90* (2017.01);
(Continued)

(58) Field of Classification Search
CPC combination set(s) only.
See application file for complete search history.

(56) References Cited

U.S. PATENT DOCUMENTS 8,373,720 B2    2/2013  Voliter et al.
2005/0140993 A1*  6/2005  Kuwata ............. H04N 1/00132
                                                                  358/1.9
(Continued)

FOREIGN PATENT DOCUMENTS

WO       2012001048       1/2012
WO     WO2013189840      12/2013

OTHER PUBLICATIONS

Baveye etal: "Saliency guided consistent color harmonization", Mar. 3, 2013, computational color imaging, springer Berlin Heidelberg, Berlin, Heidelberg, pp. 105-118.
Cohen etal: "Color harmonization", ACM SIGGRAPH 2006 courses on, SIGGRAPH '06, Jan. 1, 2006, p. 624-630.
Huo etal: "An improved method for color hamronization", image and signal processing, 2009. CISP '09. 2nd international congress on, IEEE, Piscataway, NJ, USA, Oct. 17, 2009, pp. 1-4.
(Continued)

*Primary Examiner* — Wesner Sajous
(74) *Attorney, Agent, or Firm* — Tutunjian & Bitetto, P.C.

(57) ABSTRACT

A method for harmonizing colors of an original image is disclosed. The method comprises:
  computing a saliency map of the original image,
  for each of a plurality of color harmonic schemes:
    determining a temporary harmonized image from the original image according to the current color harmonic scheme,
    computing a saliency map of the temporary harmonized image,
    comparing the saliency map of the original image and the saliency map of the temporary harmonized image, in order to obtain a saliency comparison result,
    computing a corrected color comparison result from colors of the original image, colors of the current color harmonic scheme and the saliency comparison result,
(Continued)

selecting, as the harmonized image, the temporary harmonized image obtained with the color harmonic scheme minimizing the corrected color comparison result.

19 Claims, 4 Drawing Sheets

(51) Int. Cl.
    *G06T 5/40* (2006.01)
    *H04N 1/60* (2006.01)
    *H04N 5/202* (2006.01)
    *H04N 9/64* (2006.01)
    *G09B 19/00* (2006.01)
    *G06T 11/00* (2006.01)
    *G06K 9/46* (2006.01)
    *H04N 1/62* (2006.01)
    *H04N 1/64* (2006.01)
    *G06T 7/90* (2017.01)
    *G01J 3/52* (2006.01)

(52) U.S. Cl.
    CPC ............. *G06T 11/001* (2013.01); *H04N 1/62* (2013.01); *H04N 1/644* (2013.01); *H04N 9/64* (2013.01); *G01J 3/528* (2013.01)

(56) References Cited

U.S. PATENT DOCUMENTS

| | | | |
|---|---|---|---|
| 2006/0170939 A1* | 8/2006 | Misumi | H04N 1/6058 358/1.9 |
| 2007/0133017 A1* | 6/2007 | Kobayashi | G06T 5/009 358/1.9 |
| 2010/0226564 A1* | 9/2010 | Marchesotti | G06F 17/30256 382/159 |
| 2011/0243232 A1 | 10/2011 | Alshina et al. | |

OTHER PUBLICATIONS

Lee etal: "A novel color transfer algorithm for impressionisitic paintings", Jul. 16, 2012, advances in visual computing, Springer Berlin, Heidelberg, Berlin, Heidelberg, pp. 513-522.
Search Report Dated Nov. 5, 2014.
Masataka Tokumaru, Color Design Support System Considering Color Harmony, IEEE International Conference, Feb. 2002.
Hanghang Tong, Blur Detection for Digital Images Using Wavelet Transform, 2004 IEEE International Conference on Multimedia and Expo (ICME), Jun. 2004.
Joust Van De Weijer et al., Learning Color Names for Real-World Applications, IEEE Transactions on Image Processing, vol. 18, No. 7, July 2009.
Yanli Wan et al., Image Composition With Color Harmonization, International Journal of Pattern Recognition and Artificial Intelligence, Aug. 2012.
Pere Obrador, Automatic color scheme picker for document templates based on image analysis and dual problem, SPIE Conference on Digital Publishing, Jan. 16-17, 2006, San Jose, CA.
Niikhil Sawant et al., Color Harmonization for Videos, Sixth Indian Conference on Computer Vision, Graphics and Image Processing, Dec. 2008.
Zhen Tang et al., Color harmonization for images, Journal of Electronic Imaging, Apr.-Jun. 2011.
Zhen Tang et al., Image Composition with Color Harmonization, Conference: Image and Vision Computing New Zealand, Nov. 2010.
Dr. Ing. Lev Polossin, Harmonization of Multimedia Color Conversion, Saint Petersburg Russia.
Polossin, "Harmonisierung der multimediafarbenwandlung" in Journal: ITG—Fachberichte | No. 136 | pp. 327-330, "Multimedia: Anwendungen, Technologie, Systeme (Multimedia: Application, Technology, System)", Publisher : VDE—Verlag, Publication Date : 1995.

\* cited by examiner

METHOD FOR HARMONIZING COLORS, CORRESPONDING COMPUTER PROGRAM AND DEVICE

This application claims the benefit, under 35 U.S.C. §119 of European Patent Application No. 14305728.9, filed May 19, 2014.

FIELD

The invention relates to image processing, in particular in order to harmonize the colors of the image and/or increase the coding efficiency.

BACKGROUND

The paper "Color Harmonization" from Daniel Cohen-Or and al., published July 2006 by Association for Computing Machinery, describes a method for harmonizing colors of an original image in order to obtain an harmonized image, the method comprising:

for each of a plurality of color harmonic schemes, computing a color comparison result from colors of the original image and colors of the current color harmonic scheme, selecting the harmonized image obtained with the color harmonic scheme minimizing the color comparison result.

In the paper, the color comparison result (F) is given by:

$$F = \sum_p \|H(p) - E(m, \alpha)\| \cdot S(p)$$

where p is a pixel, H(p) and S(p) respectively denote the hue and saturation value of the pixel p, $\|\ \|$ refers to the arc-length distance on the hue wheel, $E(m,\alpha)$ is the sector edge hue of the harmonic scheme $(m,\alpha)$ that is closest to the hue value of the pixel p.

The method described in this paper has the disadvantage of producing an harmonized image which is not always faithful with respect to the composition of the original image.

SUMMARY OF THE INVENTION

It is proposed a method for harmonizing colors of an original image according to claim 1.

The inventors have noticed that the color harmonization proposed in the previous paper results sometimes in some parts of the original image becoming more salient, while other parts of the original image become less salient. The composition of the harmonized image is therefore not similar to the composition of the original image.

Thanks to the invention, the difference in saliency between the original image and the harmonized image candidates may be taken into account for selecting the harmonized image. In this manner, it is possible to obtain an harmonized image that looks like the original image.

Other features of the method are set forth in claims 2 to 9.

It is also proposed a computer program according to claim 10 and a device for harmonizing colors of an original image according to claim 11.

BRIEF DESCRIPTION OF THE DRAWING

An embodiment of the invention will now be described by way of example only and with reference to the appended figures.

DETAILED DESCRIPTION OF THE DRAWING

The invention makes use of color harmonic scheme CHS. A color is for example represented by a hue value defining a type of color. A definition of hue may be: the degree to which a stimulus can be described as similar to or different from stimuli that are described as red, green, blue, and yellow. A color harmonic scheme CHS is a selection of colors that are considered to be harmonic when used in an image without other colors. The colors may be for example ordered in a sequence of colors. In that case, the selection may be formed by one or several color ranges of this sequence. For instance, all the possible colors are often grouped in a predefined cycle sequence, referred to as a color wheel (or hue wheel when hue model is used). In that case, it is possible to represent the colors by angles on the color wheel and each color range is equivalent to a sector of the color wheel.

In the described example, a color is represented by a hue value according to the hue-saturation-value HSV model. However, other model could be used, such as the hue-saturation-lightness HSL model.

In the described example, predefined color harmonic schemes CHS are used. The predefined color harmonic schemes are obtained from a set of predefined color templates.

Figure 1:
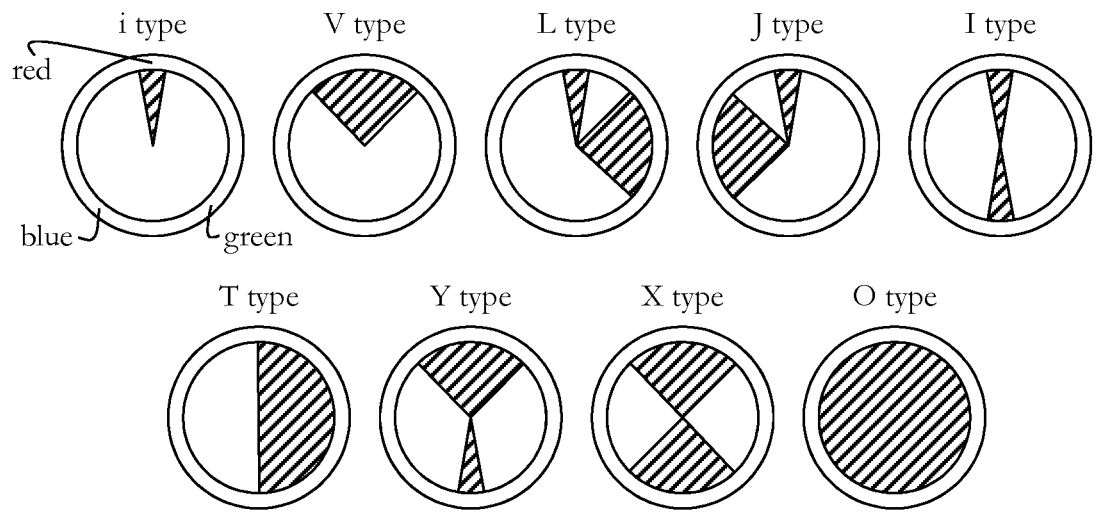
FIG. 1 illustrates color templates.

With reference to FIG. 1, an example of nine predefined color templates represented in the color wheel is illustrated. Each predefined color template comprises one or several predefined color ranges (on FIG. 1, the sectors corresponding to the color ranges are hatched).

For instance, the first predefined color template, referred to as the "i type" color template, comprises only one color range having an arc-length of less than 30°, for example 20°.

The second predefined color template, referred to as the "V type" color template, comprises only one color range having an arc-length between 60° and 120°, for example 90°.

The third predefined color template, referred to as the "L type" color template, comprises only two color ranges, the first having an arc-length of less than 30°, for example 20°, and the second having an arc-length between 60° and 120°, for example 90°, and the second color range being shifted by +90° from the first color range (the shift is considered between their bisectors).

The fourth predefined color template, referred to as the "J type" color template, comprises only two color ranges. The first color range has an arc-length of less than 30°, for example 20°, and the second color range has an arc-length between 60° and 120°, for example 90°. The second color range is shifted by −90° from the first color range (the shift is considered between their bisectors).

The fifth predefined color template, referred to as the "I type" color template, comprises only two color ranges, both having an arc-length of less than 30°, for example 20°. The second color range is shifted by 180° from the first color range (the shift is considered between their bisectors).

The sixth predefined color template, referred to as the "T type" color template, comprises only one color range having an arc-length between 120° and 240°, for example 180°.

The seventh predefined color template, referred to as the "Y type" color template, comprises only two color ranges. The first color range has an arc-length between 60° and 120°, for example 90°, and the second color range has an arc-length of less than 30°, for example 20°. The second color range is shifted by 180° from the first color range (the shift is considered between their bisectors).

The eighth predefined color template, referred to as the "X type" color template, comprises only two color ranges, both having an arc-length between 60° and 120°, for example 90°. The second color range is shifted by 180° from the first color range (the shift is considered between their bisectors).

The ninth predefined color template, referred to as the "O type" color template, comprises only one color range having an arc-length 360°. The "O type" color template is useful in order to not harmonize images containing all colors equally, like an image containing rainbow pictures for example.

The predefined color harmonic schemes CHS comprise all color templates obtained by rotating the predefined color templates with each of a plurality of predefined rotation angles α. Preferably, the predefined rotation angles α are equally spaced on a full circle, that is to say from 0° to 360°. If 256 predefined rotation angles α are used in combination with the nine predefined color templates, 9×256=2 304 predefined color harmonic schemes CHS are obtained.

Figure 2:
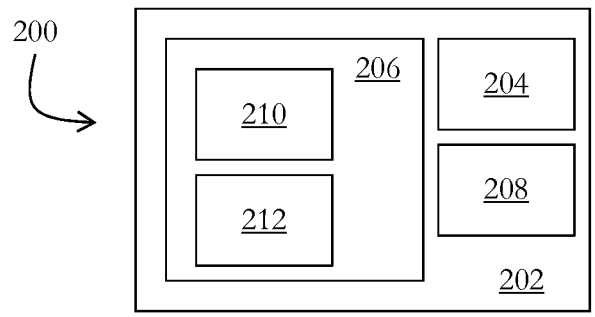
FIG. 2 illustrates an image processing device according to the invention.

With reference to FIG. 2, an image processing device 200 forming an exemplary embodiment of the invention will now be described. Some steps are in general optional, but are carried out in the described example. These optional steps are indicated by dotted lines on FIG. 2.

The image processing device 200 comprises a computer 202 including a central processing unit 204, a computer medium 206 (such as a memory and/or a hard drive and/or a removable drive and/or a removable disk and/or a random access memory) and a human-computer interface 208 including for example a display device, a keyboard and a mouse.

The image processing device 200 further comprises a color video 210 stored in the computer medium 206. The color video 210 comprises consecutive frames (hereinafter referred to as images) intended to be displayed one after the other on a display device, such as the display device of the human-computer interface 208. Each image comprises pixels, and each pixel has a color represented for example according to the hue-saturation-value HSV representation, that is to say that a hue value, a saturation value and a value is associated with each pixel of the image.

The image processing device 200 further comprises a computer program 212 recorded in the computer medium 206. The computer program 212 comprises software components comprising instructions which, when executed by the computer 202, in particular by the central processing unit 204, make the computer 202 carry out the image processing method which will be described with reference to FIG. 3. For instance, each software component is intended to make computer carry out a respective one of the steps that will be described below.

The computer program 212 is intended to process each image of the color video 210 in order to obtain an harmonized image HI for the considered image. The image being processed is hereinafter referred to as the original image OI.

Figure 3:
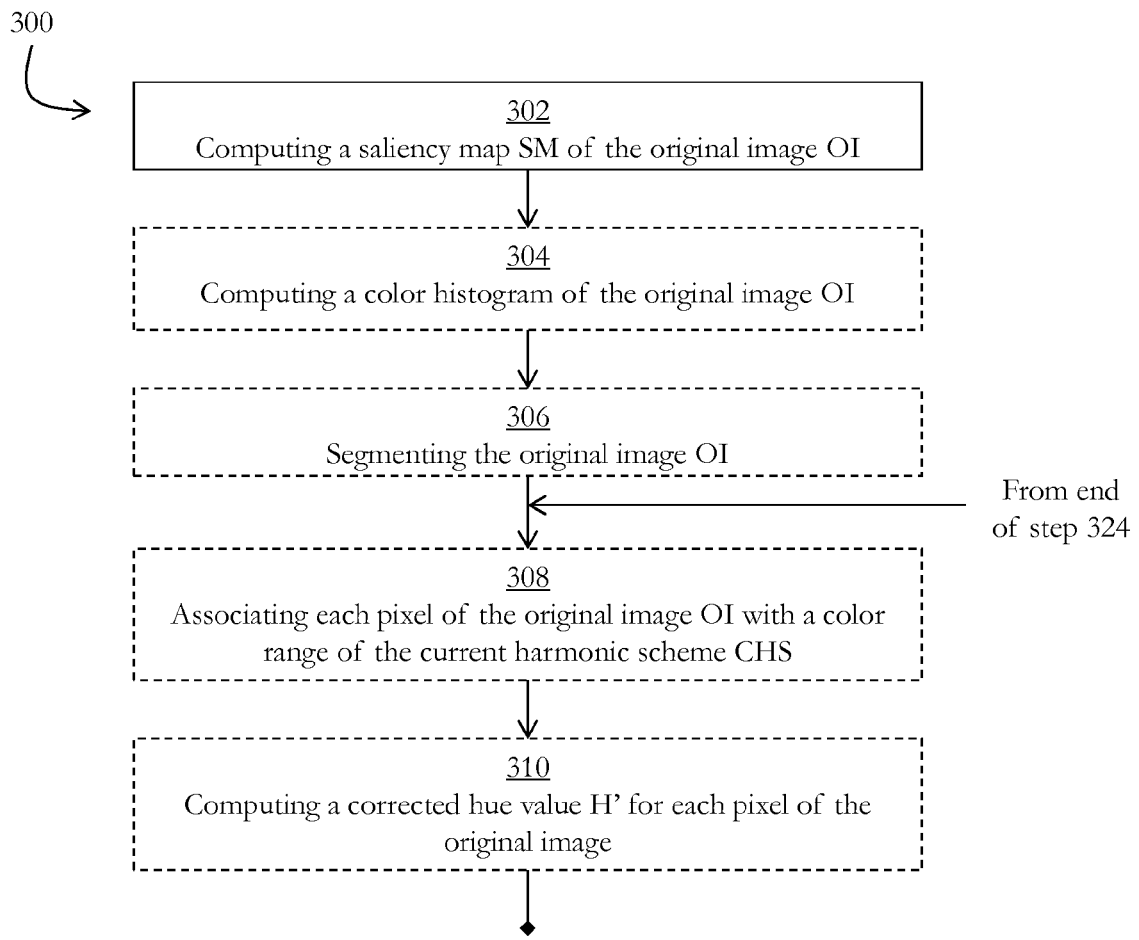
FIG. 3 illustrates an image processing method carried out for example by the image processing device of FIG. 2.
Figure 3:
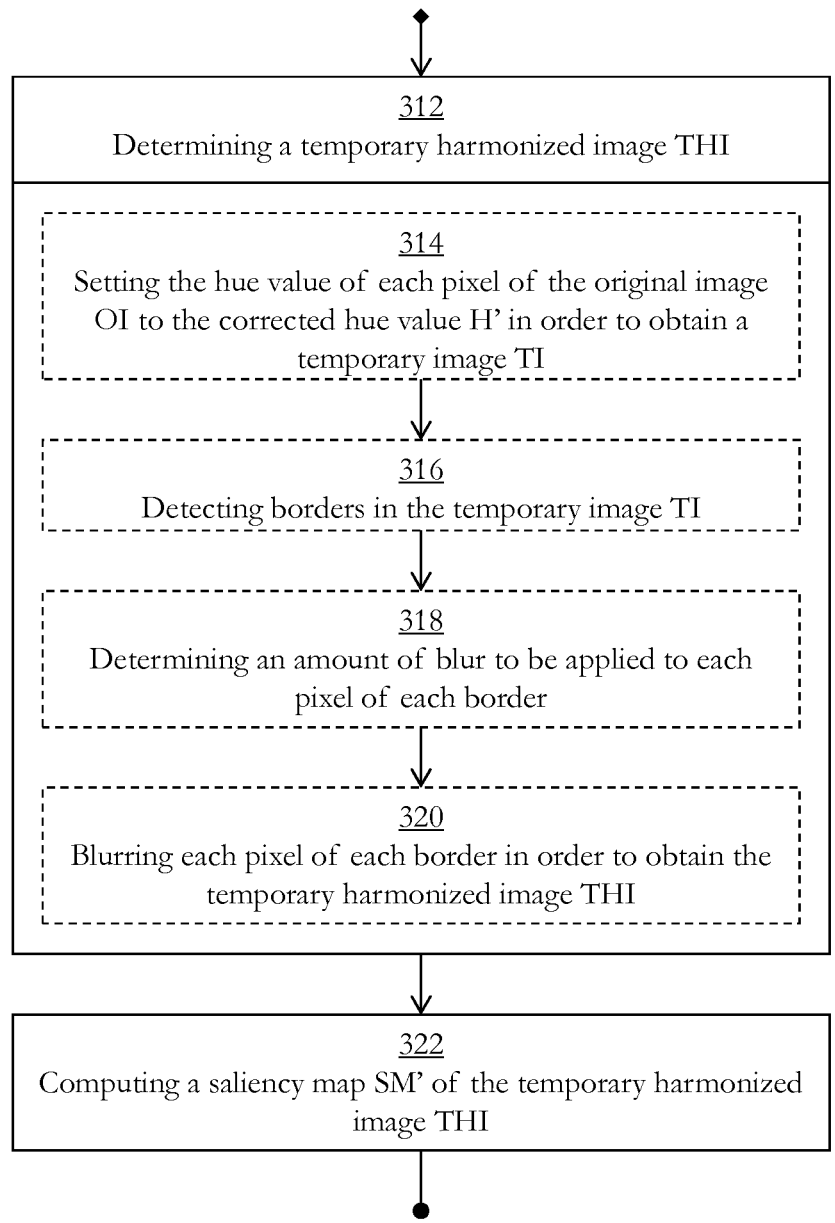
Figure 3:
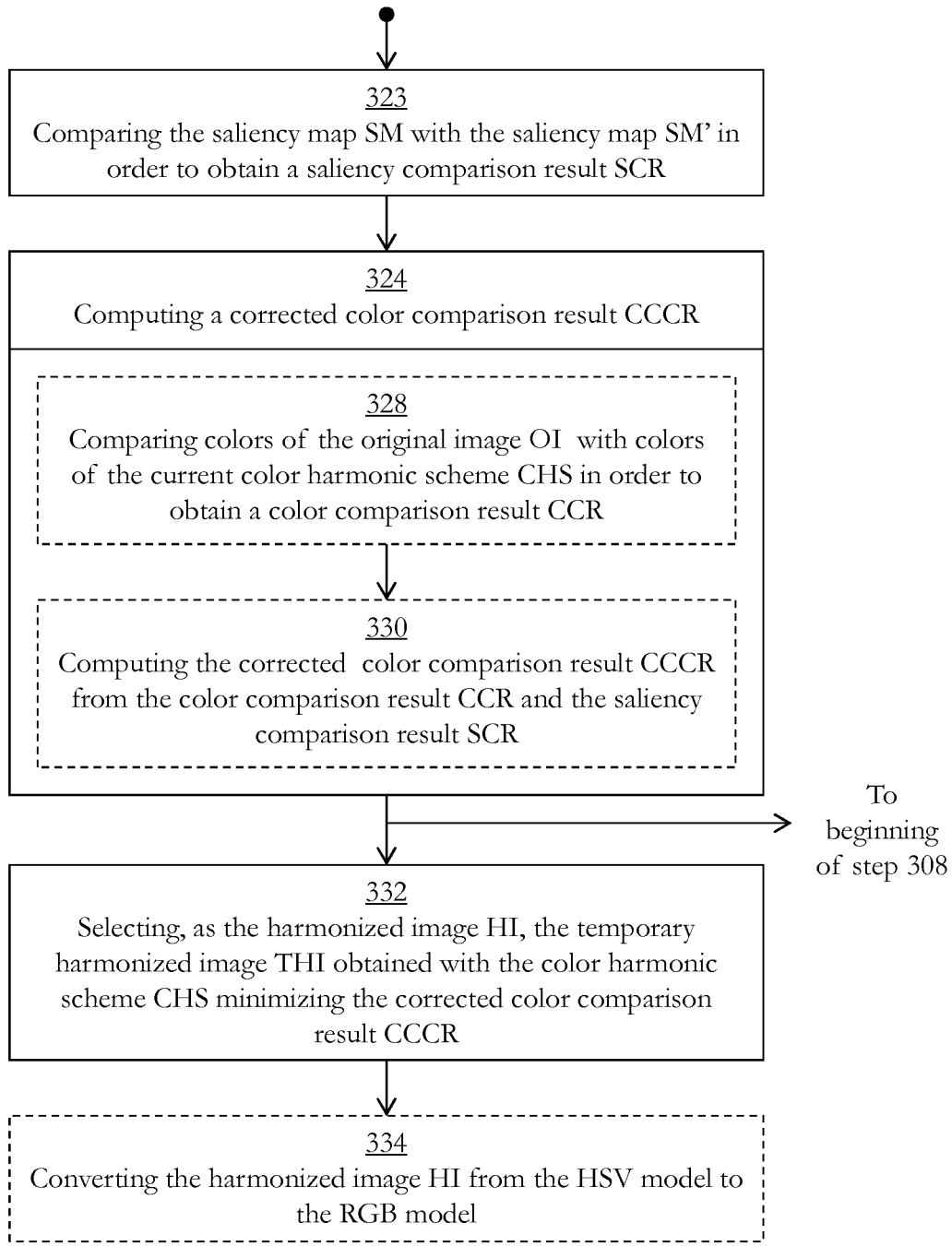

With reference to FIG. 3, an image processing method 300 carried out for example by the image processing device 200 of FIG. 2 and forming an exemplary embodiment of the invention will now be described. In the described example, the following steps are carried out by the computer 202 executing the instructions of the computer program 212 contained in the software components of this computer program 212.

During a step 302, the computer 202 computes a saliency map SM of the original image OI. The saliency map SM is computed by associating each pixel of the original image OI with a saliency value representing how salient this pixel is in the original image OI. The saliency value is for example in the range from 0 (less salient) to 255 (most salient). This may be carried out according to the method described in the patent application publication EP 1 695 288, which is based on the modeling of visual device.

In the described example, during a step 304, the computer 202 computes a color histogram of the original image OI. In the described example, the color histogram is an hue histogram normalized by saturation and value. For example, the hue histogram $M=[M_i]$ is given by:

$$M_i = \frac{1}{\Sigma_{(x,y)} S[x,y] \times V[x,y]} \times \sum_{(x,y) \in \{(u,v) | H[u,v]=i\}} S[x,y] \times V[x,y]$$

where M is the hue histogram, i is the index of the bins, $M_i$ is the value of the hue histogram for the bin i, each bin i being delimited by respective values u and v of S*V, S[x,y] is the saturation of the pixel located at position [x,y] in the original image OI, V[x,y] is the value (according to the HSV model) of the pixel located at position [x,y], and (x,y) represents the pixel located at position [x,y].

In the described example, during a step 306, the computer 202 segments the original image OI. Each segmented area regroups pixels having colors close to each other according to a color similarity condition. An example of color segmentation may be found in "*Learning Color Names for Real-World Applications*", J. van de Weijer et al, IEEE Transactions in Image Processing, 2009.

Steps 308 to 330 are carried out for each of a plurality of predefined color harmonic schemes CHS, such as the ones described in reference to FIG. 1.

In the described example, during a step 308, the computer 202 associate each pixel of the original image OI with a color range of the current color harmonic scheme CHS. In the described example, this is carried out by associating the pixel(s) of each segmented area of the original image OI with a same color range of the current color harmonic scheme CHS. For example, the pixel(s) of each segmented area are associated with the color range that is the closest to the pixel(s) according to a color proximity condition. For example, the pixel(s) of each segmented area are all associated with the color range that is the closest to a mean of the colors of the pixel(s) of the segment.

In the described example, during a step 310, the computer 202 computes, for each pixel of the original image OI, a corrected hue value H'(p) from the hue value H(p) of this pixel and the color range of the current color harmonic scheme CHS associated with this pixel. The corrected hue value H'(p) is computed so as to be closer to the color range associated with the pixel than the original hue value H(p) of the pixel. Preferably, the corrected hue value H'(p) is located inside the color range associated with the pixel. For example, the computation of the corrected hue value H'(p) is carried out by applying a function, called harmonizing function, to the hue value H(p) of the pixel. Preferably, the harmonizing function is a sigmoid function of the hue value. In this way, it is possible to choose the sigmoid function so that, when the hue value H(p) of the pixel is far away from the color range, the asymptotic behavior of the sigmoid function gives a corrected hue value (H'(p) inside the color range, for example at the closest edge of the color range. Furthermore, it is possible to choose the sigmoid function so as to obtain, when the hue value H(p) of the pixel is inside the color range, a linear modification of the hue value H(p), which gives a natural feeling to the color harmonization.

In the described example, the corrected hue value H'(p) is given by:

$$H'(p) = C(p) + \frac{W}{2} \times \tanh\left(\frac{2 \times \|H(p) - C(p)\|}{w}\right)$$

where p is the considered pixel, H(p) is the hue value of the pixel p, H'(p) is the corrected hue value of the pixel p, C(p) is the central hue value of the hue sector associated with the pixel p, w is the length—along the hue sequence—of the hue sector, and $\| \|$ refers to the distance—along the hue sequence—between H(p) and C(p).

In the described example, the corrected hue values H'(p) are regrouped in a hue mapping map HMM having dimensions equal to those of the original image OI.

During a step 312, the computer 202 determines a temporary harmonized image THI from the original image OI according to the current color harmonic scheme CHS.

In the described example, the step 312 comprises the following steps 314, 316, 318 and 320.

During the step 314, the computer 202 sets the hue value H(p) of each pixel of the original image OI to the corrected hue value H'(p) computed for this pixel, in order to obtain a temporary image TI.

During the step 316, the computer 202 detects edges in the temporary image TI, for example by applying a gradient filter on the hue mapping map HMM.

During the step 318, the computer 202 determines, for each pixel of each edge, an amount of blur to be applied to and around this pixel. The number of pixels to be blurred depends on the amount of blur at this pixel. The amount of blur is for example computed according to the paper "Blur detection for digital images using wavelet transform", from H. Tong, M. Li, H. Zhang and C. Zhang, IEEE International Conference on Multimedia & Expo, IEEE Press, pp. 17-20, 2004.

During the step 320, the computer 202 blurs each pixel of each edge in the temporary image TI by the amount of blur determined for this pixel, in order to obtain the temporary harmonized image HI.

The steps 306, 308, 310, 316, 318 and 320 are useful to avoid processing artifacts. For instance, some artifacts could be created during the step 314 because two neighboring pixels that have similar colors could be mapped into two different color ranges of a color harmonic scheme. The segmentation removes these artifacts, because all pixels that are in the same segmented area are mapped in the same color range. However, the segmentation may not be perfect and some artifacts may still appear at edges of segmented areas if each segmented area has been shifted in a different color range and if their color was originally close. These artifacts usually appear only on frontiers of segmented areas that undergo a hue mapping in opposite directions. This problem is solved by detecting edges and applying blur at the edges.

During a step 322, the computer 202 computes a saliency map SM' of the temporary harmonized image THI.

During a step 323, the computer 202 compares the saliency map SM of the original image OI and the saliency map SM' of the temporary harmonized image THI, in order to obtain a saliency comparison result SCR. In the described example, the saliency comparison result SCR is a linear correlation coefficient between the saliency map SM of the original image OI and the saliency map SM' of the temporary harmonized image THI For example, the saliency comparison result SCR is given by:

$$SCR = \frac{\Sigma_{(x,y)}(SM[x, y] - \mu) \cdot (SM'[x, y] - \mu')}{\sqrt{\sigma^2 \cdot \sigma'^2}}$$

where $\mu$ is the mean of the saliency values of the pixels of the original image OI, $\mu'$ is the mean of the saliency values of the pixels of the temporary harmonized image THI, $\sigma$ is the divergence of the saliency values of the pixels of the original image OI, and $\sigma'$ is the divergence of the saliency values of the pixels of the temporary harmonized image THI.

During a step 324, the computer 202 computes a corrected color comparison result CCCR from colors of the original image OI, colors of the current color harmonic scheme CHS and the saliency comparison result SCR.

In the described example, the step 324 comprises the following steps 328 and 330.

During the step 328, the computer 202 compares colors of the original image OI with colors of the current color harmonic scheme CHS, in order to obtain a color comparison result CCR.

In the described example, the color comparison result CCR is the result of a comparison between a hue distribution M of the original image OI and a hue distribution P of the color harmonic scheme CHS.

In the described example, the hue distribution M of the original image OI is the hue histogram of the original image OI computed at step 304.

In the described example, the hue distribution P of the current color harmonic scheme CHS is a uniform distribution. For example, the hue distribution $P=[P_i]$ of the current color harmonic scheme HS is given by:

$$P_i(m, \alpha) = \begin{cases} \sum_{k=1}^{n} S_i^k(m, \alpha_k) & \text{if } \sum_{k=1}^{n} S_i^k(m, \alpha_k) \neq 0 \\ \frac{0.01}{L} \times \sum_{i}\left(\sum_{k=1}^{n} S_i^k(m, \alpha_k)\right) & \text{otherwise} \end{cases}$$

where $S_i^k$ is the distribution of the color range k (n being the total number of color ranges for template $T_m$) and is defined by:

$$S_i^k(m, \alpha_k) = \begin{cases} \exp\left(-\frac{1}{1-\left(\frac{2 \times \|i - \alpha_k\|}{w}\right)^{10}}\right) & \text{if } i \in ]\alpha_k - \frac{w}{2}, \alpha_k + \frac{w}{2}[ \\ 0 & \text{otherwise} \end{cases}$$

where w is the length of the considered color range of the current color harmonic scheme CHS, $a_k$ is the center of the considered color range, n is the number of color ranges defined for template $T_m$, L is the number of bins, and $\|\ \|$ refers to the distance along the hue sequence, i.e. in the described example the arc-wheel distance for example in degrees.

In the described example, the color comparison result CCR is the Kullback-Leibler divergence of color distribution M of the original image OI from the color distribution P of the current color harmonic scheme CHS. The color comparison result CCR is therefore given by:

$$CCR = \sum_i M_i \cdot \ln\left(\frac{M_i}{P_i}\right)$$

During the step 330, the computer 202 computes the corrected color comparison result CCCR from the color comparison result CCR and the saliency comparison result SCR. More precisely, the computer 202 computes the corrected color comparison result CCCR by dividing the color comparison result CCR with the saliency comparison result SCR:

$$CCCR = \frac{CCR}{SCR}$$

During a step 332, the computer 202 selects, as the harmonized image HI, the temporary harmonized image THI obtained with the color harmonic scheme CHS minimizing the corrected color comparison result CCCR.

In the described example, during a step 334, the computer 202 converts the harmonized image HI from the HSV model to the RGB model in order to obtain an RGB harmonized image HI.

The RGB harmonized image HI may then be displayed on a display device, such as the display device of the human-computer interface 208. In a variant, the computer 202 may encode the RGB harmonized image HI, and stores data representing the encoded RGB harmonized image HI on a computer medium, such as the computer medium 206. The encoding may for example be the one described in US 2011/0243232 A1. The encoding described in this patent application encodes the colors according to a dynamic color range. Because the image has been harmonized, the colors used in the image have a smaller color range, which makes the encoding process more efficient.

Once all the images of the color video 210 have been processed, the computer 202 produces a processed color video which is for example displayed on a display device, such as the display device of the human-computer interface 208.

As it is apparent from the previous description, a method and device according to the invention improve coding efficiency by proposing a new way to decrease original color palette of the original image while preserving the harmony and the original color rendering of the original image.

The present invention is not limited to the embodiment previously described, but instead defined by the appended claims. It will in fact be apparent to the one skilled in the art that modifications can be applied to the embodiment previously described.

For example, the software components of the computer program intended to make the computer 202 carry out each step of the color video processing method 300 could be replaced entirely or in part by hardware components.

Furthermore, the images are not limited to 2D images, but could also be for example 3D pictures.

Furthermore, the color of a pixel could be represented by another quantity or several other quantities, such as RGB values, instead of a hue value.

Besides, the terms used in the appended claims shall not be understood as limited to the elements of the embodiments previously described, but on the contrary shall be understood as including all equivalent elements that the one skilled in the art is able to derive using their general knowledge.

The invention claimed is:

1. A method for harmonizing colors of an original image, the method comprising:
   computing, using a processor, at least a temporary harmonized image determined from the original image according to at least one color harmonic scheme;
   computing, using said processor, a saliency map of said temporary harmonized image;
   computing, using said processor, a saliency comparison result obtained from a comparison of a saliency map of the original image and the saliency map of said temporary harmonized image;
   computing, using said processor, a corrected color comparison result from colors of the original image, colors of the color harmonic scheme and the saliency comparison result;
   selecting, as the harmonized image, the temporary harmonized image obtained with the color harmonic scheme minimizing the corrected color comparison result; and
   displaying the harmonized image on a display device.

2. The method according to claim 1, wherein the saliency comparison result is a correlation coefficient between the saliency map of the original image and the saliency map of the temporary harmonized image.

3. The method according to claim 2, wherein the correlation coefficient is a linear correlation coefficient between the saliency map of the original image and the saliency map of the temporary harmonized image.

4. The method according to claim 1, wherein the corrected color comparison result is computed by dividing a color comparison result with the saliency comparison result, the color comparison result being the result of a comparison between the colors of the original image and the colors of the color harmonic scheme.

5. The method according to claim 4, wherein the color comparison result is a result of a comparison between a hue distribution of the original image and a hue distribution of the color harmonic scheme.

6. The method according to claim 5, wherein the hue distribution of the original image is a hue histogram.

7. The method according to claim 6, wherein the hue distribution of the original image is a hue histogram normalized by saturation and value.

8. The method according to claim 5, wherein the hue distribution of the color harmonic scheme is a uniform distribution.

9. The method according to claim 5, wherein the comparison between the hue distribution of the original image and the hue distribution of the color harmonic scheme is the Kullback-Leibler divergence.

10. A non-transitory program storage device, readable by a computer, tangibly embodying a program of instructions executable by the computer to perform a method comprising:
- computing, using a processor, at least a temporary harmonized image determined from the original image according to at least one color harmonic scheme;
- computing, using said processor, a saliency map of said temporary harmonized image;
- computing, using said processor, a saliency comparison result obtained from a comparison of a saliency map of the original image and the saliency map of said temporary harmonized image;
- computing, using said processor, a corrected color comparison result from colors of the original image, colors of the color harmonic scheme and the saliency comparison result;
- selecting, as the harmonized image, the temporary harmonized image obtained with the color harmonic scheme minimizing the corrected color comparison result; and
- displaying the harmonized image on a display device.

11. A device for harmonizing colors of an original image, the device comprising at least a processor configured to:
- compute, using a processor, at least a temporary harmonized image determined from the original image according to at least one color harmonic scheme;
- compute, using said processor, a saliency map of said temporary harmonized image;
- compute, using said processor, a saliency comparison result obtained from a comparison of a saliency map of the original image and the saliency map of said temporary harmonized image;
- compute, using said processor, a corrected color comparison result from colors of the original image, colors of the color harmonic scheme and the saliency comparison result;
- select, as the harmonized image, the temporary harmonized image obtained with the color harmonic scheme minimizing the corrected color comparison result; and
- displaying the harmonized image on a display device.

12. The device according to claim 11, wherein the saliency comparison result is a correlation coefficient between the saliency map of the original image and the saliency map of the temporary harmonized image.

13. The device according to claim 12, wherein the correlation coefficient is a linear correlation coefficient between the saliency map of the original image and the saliency map of the temporary harmonized image.

14. The device according to claim 11, wherein the corrected color comparison result is computed by dividing a color comparison result with the saliency comparison result, the color comparison result being the result of a comparison between the colors of the original image and the colors of the color harmonic scheme.

15. The device according to claim 14, wherein the color comparison result is a result of a comparison between a hue distribution of the original image and a hue distribution of the color harmonic scheme.

16. The device according to claim 15, wherein the hue distribution of the original image is a hue histogram.

17. The device according to claim 16, wherein the hue distribution of the original image is a hue histogram normalized by saturation and value.

18. The device according to claim 15, wherein the hue distribution of the color harmonic scheme is a uniform distribution.

19. The device according to claim 15, wherein the comparison between the hue distribution of the original image and the hue distribution of the color harmonic scheme is the Kullback-Leibler divergence.

* * * * *